(12) United States Patent
Wang et al.

(10) Patent No.: US 12,379,348 B2
(45) Date of Patent: Aug. 5, 2025

(54) AIR-COUPLED ULTRASONIC PLANE STRESS DETECTION METHOD FOR COMPOSITE MATERIAL BASED ON DUAL-MODAL SOUND-TIME RATIOS OF LAMB WAVE

(71) Applicant: Harbin Institute of Technology, Harbin (CN)

(72) Inventors: Bingquan Wang, Harbin (CN); Jiubin Tan, Harbin (CN); Bo Zhao, Harbin (CN); Weijia Shi, Harbin (CN)

(73) Assignee: Harbin Institute of Technology, Harbin (CN)

( * ) Notice: Subject to any disclaimer, the term of this patent is extended or adjusted under 35 U.S.C. 154(b) by 336 days.

(21) Appl. No.: 18/115,790

(22) Filed: Mar. 1, 2023

(65) Prior Publication Data

US 2024/0133844 A1 Apr. 25, 2024

(30) Foreign Application Priority Data

Oct. 12, 2022 (CN) .......................... 202211246109.4

(51) Int. Cl.
*G01N 29/04* (2006.01)
*G01L 1/25* (2006.01)
*G01N 29/07* (2006.01)

(52) U.S. Cl.
CPC ............ *G01N 29/041* (2013.01); *G01L 1/255* (2013.01); *G01N 29/07* (2013.01)

(58) Field of Classification Search
None
See application file for complete search history.

(56) References Cited

U.S. PATENT DOCUMENTS

| | | | | |
|---|---|---|---|---|
| 4,872,738 A * | 10/1989 | Risk | ...................... | G02F 1/0134 |
| | | | | 359/326 |
| 2023/0213669 A1* | 7/2023 | Yu | .......................... | E21B 47/107 |
| | | | | 166/250.1 |
| 2023/0228718 A1* | 7/2023 | Li | .......................... | G01N 29/46 |
| | | | | 702/56 |

* cited by examiner

*Primary Examiner* — Suman K Nath
(74) *Attorney, Agent, or Firm* — Fideli Law PLLC; Qiang Li

(57) ABSTRACT

An air-coupled ultrasonic plane stress detection method for a composite material based on dual-modal sound-time ratios of a Lamb wave includes: S1: assembling a detection device; S2: based on the detection device and the dual-modal sound-time ratios of the Lamb wave in S1, using unidirectionally loaded stress to obtain different stress coefficient relations; S3: based on the stress coefficient relations in S2, solving stress coefficients; S4: based on the stress coefficients in S3, acquiring three sound-time ratios; S5: based on the sound-time ratios in S4, describing a stress state of a detection point; and S6: repeating S4 and S5 till completing detection and scanning. The method improves the accuracy of stress coefficient calibration and air-coupled ultrasonic stress representation of a composite material panel greatly.

9 Claims, 2 Drawing Sheets

AIR-COUPLED ULTRASONIC PLANE STRESS DETECTION METHOD FOR COMPOSITE MATERIAL BASED ON DUAL-MODAL SOUND-TIME RATIOS OF LAMB WAVE

CROSS REFERENCE TO THE RELATED APPLICATIONS

This application is based upon and claims priority to Chinese Patent Application No. 202211246109.4, filed on Oct. 12, 2022, the entire contents of which are incorporated herein by reference.

TECHNICAL FIELD

The present invention relates to the technical field of ultrasonic detection, and particularly relates to an air-coupled ultrasonic plane stress detection method for a composite material based on dual-modal sound-time ratios of a Lamb wave.

BACKGROUND

Since the continuous glass fiber production technique has been developed and has been successfully applied to reinforced phenolic resins in the 1930s, composite materials have been developed for over 80 years. Carbon fiber-reinforced resin-based composite materials for aerospace, i.e., advanced composite materials have come out in the middle of 1960s and have been first used on military aircraft structures. Over 50 years, application of the advanced composite materials in airplane structures has walked through a development road from big to small, from secondary to primary, from partial to global, from structure to function and from military aircraft to civil aircraft. Besides small density, specific strength and high specific modulus, the composite materials further have the advantages of performance adaptability, good fatigue resistance and good corrosion resistance and the like. In recent 20 years, the application ranges of the composite materials have been enlarged increasingly. Besides, aerospace, the composite materials are widely applied in the fields of ships, transportation, energy sources, buildings, machines and relaxation. However, the composite materials will be subjected to actions and influences of factors such as various processes in the manufacturing or assembling process to lead to residual stress, and the residual stress will cause warping or twisting deformation, and even cracking of composite material panels. Therefore, to research stress detection methods for the composite material panels is of great importance to prolong the service lives of the composite material panels, lower the economic loss and guarantee the safety of the devices.

Ultrasonic detection, one of the five major conventional nondestructive detection methods, features high sensitivity, high penetrating power, good directivity, high detection speed, low cost, relatively simple device, harmlessness to human body and the like. Ultrasonic detection involves in contact type and non-contact type detection. The contact type ultrasonic detection technique needs to apply an acoustic couplant between an ultrasonic transducer and a to-be-measured test sample, so as to reduce the propagating loss of acoustic energy in air. Use of the couplant, on the one hand, increases influence of human factors on the result, and on the other hand, is hard to satisfy the demand on industrial automatic production and quality control, thereby restricting the application range of ultrasonic detection. The non-contact type ultrasonic detection does not need the couplant and features simple and convenient detection process. The detection result can be prevented from being affected by human coupling factors, so that the non-contact type ultrasonic detection is one of the major development directions of fast nondestructive detection techniques. In addition, with respect to a special composite material, during contact type ultrasonic detection, water or other couplants will pollute the material and permeate into the material to damage the structure and performance of the material, so that the non-contact type ultrasonic detection can only be used for stress detection.

With development of micromachining techniques and progress of macromolecular material techniques, huge development has been achieved in manufacturing air-coupled ultrasonic transducers with high efficiency and high sensitivity. In addition to research of amplifiers with low noise and high gain and development of computer signal processing techniques, a great improvement on the air-coupled ultrasonic non-contact type nondestructive detection technique has made, and a better application achievement has gained in the field of non-contact type nondestructive detection.

Lamb wave is an elastic wave propagated in a solid panel, a particle movement direction of which is located in a plane including a wave propagation direction and a plane normal. It is proved that the property of the Lamb wave is quite complicated. With rapid development of computing capacity, there is great progress in understanding and utilizing the Lamb. A theoretical equation of the Lamb wave has been massively applied to the field of nondestructive detection. It can be known from an acoustoelastic theory that when ultrasonic waves are propagated in an anisotropic material, they will be affected by anisotropy and internal stress of the material, so that the sound velocity changes finely. Under a condition of known anisotropy of the material, the stress can be represented by means of change of the sound velocity.

Most existing ultrasonic stress detection techniques reflect the change of the sound velocity in the stress state with sound-time differences to further represent the stress. Regardless of the present invention or the prior art, to represent the unknown stress is to calibrate the stress coefficients through stretching experiments first. However, the stress coefficients in the prior art are related to the propagation distance L of the ultrasonic wave. As the actual propagation distance L of the ultrasonic wave will be affected by processing and assembling processes and cannot be acquired accurately during air-coupled ultrasonic non-contact type detection and the change of the temperature in the measurement process will further cause change of L, the stress coefficients are inaccurately calibrated and the stress measurement result is inaccurate. According to the present invention, the propagating distance L of the ultrasonic wave introduced in a stress coefficient expression is eliminated by utilizing the sound-time ratios of a symmetric mode and an asymmetric mode of the Lamb wave, influence of the assembling and processing processes and the change of the temperature on stress measurement in air-coupled ultrasonic stress detection is eliminated, so that the accuracy of quantitatively representing the stress is improved.

SUMMARY

The present invention provides an air-coupled ultrasonic plane stress detection method for a composite material based on dual-modal sound-time ratios of a Lamb wave, which reduces errors so as to improve the accuracy of stress coefficient calibration and air-coupled ultrasonic stress representation of a composite material panel greatly.

The present invention is implemented by the technical solution as follows:

An air-coupled ultrasonic plane stress detection method for a composite material based on dual-modal sound-time ratios of a Lamb wave specifically includes the following steps:

S1: assembling a detection device;
S2: based on the detection device and the dual-modal sound-time ratios of the Lamb wave in S1, using unidirectionally loaded stress to obtain different stress coefficient relations;
S3: based on the stress coefficient relations in S2, solving stress coefficients;
S4: based on the stress coefficients in S3, acquiring three sound-time ratios;
S5: based on the sound-time ratios in S4, describing a stress state of a detection point; and
S6: repeating S4 and S5 till completing detection and scanning.

An air-coupled ultrasonic plane stress detection method for a composite material based on dual-modal sound-time ratios of a Lamb wave, where S1 is specifically as follows: the detection device includes a function signal generator, a 50-ohm load, a low pass filter, a high speed acquisition board, an anti-aliasing filter, a pre-amplifier, an upper computer, an exciting air-coupled transducer 1, a receiving air-coupled transducer 2 and a composite material panel 3;

a signal emitted by the function signal generator is emitted to the composite material panel 3 through the 50-ohm load, the low pass filter and the exciting air-coupled transducer 1, the composite material panel 3 reflects the received signal back to the receiving air-coupled transducer 2, and the receiving air-coupled transducer 2 transmits the signal to the upper computer through the pre-amplifier, the anti-aliasing filter and the high speed acquisition board.

An air-coupled ultrasonic plane stress detection method for a composite material based on dual-modal sound-time ratios of a Lamb wave, where the dual-modal sound-time ratios of the Lamb wave in S2 specifically include: defining a sound velocity matrix $[V_{ij}]$:

$$V_{ij}=(V_{ij})_0+\Delta V_{ij}, \Delta V_{ij}=\alpha_{ij}\sigma_{kl} \quad (1)$$

where $\alpha_{ij}$ is a matrix representing an orthotropic stress coefficient, and the form of the matrix is similar to that of a rigidity matrix:

$$[\alpha_{ij}] = \begin{bmatrix} \alpha_{11} & \alpha_{12} & \alpha_{13} & & & \\ \alpha_{12} & \alpha_{22} & \alpha_{23} & & 0 & \\ \alpha_{13} & \alpha_{23} & \alpha_{33} & & & \\ & & & \alpha_{44} & & \\ & 0 & & & \alpha_{55} & \\ & & & & & \alpha_{66} \end{bmatrix} \quad (2)$$

For the stress in an XOY plane, $\sigma_{zz}=\sigma_{xz}=\sigma_{yz}=0$; then:

$$[\Delta V_{ij}] = \begin{bmatrix} \Delta V_X & & \\ & \Delta V_Y & \\ & & \Delta V_Z \end{bmatrix} = \quad (3)$$

-continued $$\begin{bmatrix} \alpha_{11}\sigma_{xx}+\alpha_{12}\sigma_{yy} & \alpha_{66}\sigma_{xy}/2 & \\ \alpha_{66}\sigma_{xy}/2 & \alpha_{12}\sigma_{xx}+\alpha_{22}\sigma_{yy} & \\ & & \alpha_{13}\sigma_{xx}+\alpha_{23}\sigma_{yy} \end{bmatrix}$$

A sound velocity change matrix $[\Delta V_{ij}]$ has a vector decomposition characteristic similar to that of the stress, a principle value of $[\Delta V_{ij}]$ is as follows:

$$\Delta V_{X,Y} = \frac{1}{2}\Big\{[(\alpha_{11}+\alpha_{12})\sigma_{xx}+(\alpha_{12}+\alpha_{22})\sigma_{yy}] \pm \sqrt{[(\alpha_{11}-\alpha_{12})\sigma_{xx}+(\alpha_{12}-\alpha_{22})\sigma_{yy}]^2+(\alpha_{66}\sigma_{xy})^2}\Big\} \quad (4)$$

$$\tan 2\phi = \frac{\alpha_{66}\sigma_{xy}}{(\alpha_{11}-\alpha_{12})\sigma_{xx}+(\alpha_{12}-\alpha_{22})\sigma_{yy}} \quad (5)$$

there is the following relation between the stress in any direction and the principal stress $\sigma_1$ and $\sigma_2$:

$$\begin{cases} \sigma_{xx} = \frac{1}{2}[\sigma_1+\sigma_2+(\sigma_1-\sigma_2)\cos 2\theta] \\ \sigma_{yy} = \frac{1}{2}[\sigma_1+\sigma_2-(\sigma_1-\sigma_2)\cos 2\theta] \\ \sigma_{xy} = \frac{1}{2}(\sigma_1-\sigma_2)\sin 2\theta \end{cases} \quad (6)$$

the equation (6) is substituted into the equation (4) to obtain sound velocity change $\Delta V_\omega$ in any direction in the state of plane stress as follows:

$$\Delta V_\omega = \frac{1}{2}\Big[\frac{\sigma_1+\sigma_2}{2}(\alpha_{11}+\alpha_{22}+2\alpha_{12}) + \frac{\sigma_1-\sigma_2}{2}(\alpha_{11}-\alpha_{22})\cos 2\theta\Big] + \frac{1}{2}\Bigg\{\Bigg[\frac{\frac{\sigma_1+\sigma_2}{2}(\alpha_{11}-\alpha_{22})+}{\frac{\sigma_1-\sigma_2}{2}(\alpha_{11}+\alpha_{22}-2\alpha_{12})\cos 2\theta}\Bigg]^2 + \Big(\frac{\sigma_1-\sigma_2}{2}\alpha_{66}\sin 2\theta\Big)^2\Bigg\}^{\frac{1}{2}} \cos 2(\omega-\phi) \quad (7)$$

the equation (5) is substituted into the equation (7) to obtain a relation between the velocity change and the principal stress of the plane as follows:

$$\Delta V_\omega = \frac{\alpha_{11}+\alpha_{22}+2\alpha_{12}}{4}(\sigma_1+\sigma_2) + \frac{\alpha_{11}-\alpha_{22}}{4}(\sigma_1-\sigma_2)\cos 2\theta + \frac{\alpha_{11}-\alpha_{22}}{4}(\sigma_1+\sigma_2)\cos 2\omega + \frac{\alpha_{11}+\alpha_{22}-2\alpha_{12}}{4}(\sigma_1-\sigma_2)\cos 2\theta\cos 2\omega + \frac{\alpha_{66}}{4}(\sigma_1-\sigma_2)\sin 2\theta\sin 2\omega \quad (8)$$

the following constants are introduced:

$$\begin{cases} n_1 = (\alpha_{11}-\alpha_{22})/4 \\ n_2 = (\alpha_{11}+\alpha_{22}+2\alpha_{12})/4 \\ n_3 = (\alpha_{11}+\alpha_{22}-2\alpha_{12})/4 \\ n_4 = \alpha_{66}/4 \end{cases} \quad (9)$$

the equation (8) can be transformed into:

$$\Delta V_\omega = K_1\sigma_1 + K_2\sigma_2$$

$$K_1 = n_1(\cos 2\theta + \cos 2\omega) + n_2 + n_3 \cos 2\theta \cos 2\omega + n_4 \sin 2\theta \sin 2\omega$$

$$K_2 = -n_1(\cos 2\theta - \cos 2\omega) + n_2 - n_3 \cos 2\theta \cos 2\omega - n_4 \sin 2\theta \sin 2\omega \quad (10)$$

where K1 and K2 are proportionality coefficients between velocity change and the principal stress $\sigma_1$ and $\sigma_2$ of the plane, respectively.

An air-coupled ultrasonic plane stress detection method for a composite material based on dual-modal sound-time ratios of a Lamb wave, where the Lamb wave is propagated in the composite material panel the phase velocities of a symmetric mode and an asymmetric mode of the Lamb wave can be represented as:

$$V_{S0\sigma} = K_1\sigma_1 + K_2\sigma_2 + V_{S0}$$

$$V_{A0\sigma} = K_1\sigma_1 + K_2\sigma_2 + V_{A0} \quad (11)$$

where $V_{S0\sigma}$ and $V_{A0\sigma}$ are phase velocities of the symmetric mode and the asymmetric mode in the stress state, and $V_{S0}$ and $V_{A0}$ are initial phase velocities of the symmetric mode and the asymmetric mode in the unstress state.

An air-coupled ultrasonic plane stress detection method for a composite material based on dual-modal sound-time ratios of a Lamb wave, where a ratio of propagation time of the asymmetric mode to propagation time of the symmetric mode is taken as follows:

$$R = \frac{T_{A0\sigma}}{T_{S0\sigma}} = \frac{V_{S0\sigma}}{V_{A0\sigma}} = \frac{K_1\sigma_1 + K_2\sigma_2 + V_{A0}}{K_1\sigma_1 + K_2\sigma_2 + V_{S0}} = 1 + \frac{V_{A0} - V_{S0}}{K_1\sigma_1 + K_2\sigma_2 + V_{S0}} \quad (12)$$

the equation (12) is the relation between the ratio of the propagation time of the symmetric mode to the propagation time of the asymmetric mode of the Lamb wave and the principal stress in the plane problem of the composite material. There are three unknown quantities $\sigma_1$, $\sigma_2$ and $\theta$ for the orthotropic panel in the stress state of the plane. Therefore, it needs to measure the ratios $R_{\omega 1}$, $R_{\omega 2}$ and $R_{\omega 3}$ of the propagation time of the symmetric mode to the propagation time of the asymmetric mode of the Lamb wave in three different directions $\omega_1$, $\omega_2$ and $\omega_3$, and the ratios are solved through simultaneous equations.

An air-coupled ultrasonic plane stress detection method for a composite material based on dual-modal sound-time ratios of a Lamb wave, where the unidirectionally loaded stress is $\sigma_1 = \sigma$ and $\sigma_2 = 0$, and the equation (12) can be transformed into:

$$R = \frac{T_{A0\sigma}}{T_{S0\sigma}} = \frac{V_{S0\sigma}}{V_{A0\sigma}} = \frac{K_1\sigma + V_{A0}}{K_1\sigma + V_{S0}} = 1 + \frac{V_{A0} - V_{S0}}{K_1\sigma + V_{S0}} \quad (17)$$

$$K_1 = n_1(\cos 2\theta + \cos 2\omega) + n_2 + n_3\cos 2\theta\cos 2\omega + n_4\sin 2\theta\sin 2\omega$$

$\theta$ in the equation (17) is an included angle between a fiber direction and the stress, $\omega$ is an included angle between a detection direction and the fiber direction, and the two angles are combined differently to obtain different stress coefficient relations.

An air-coupled ultrasonic plane stress detection method for a composite material based on dual-modal sound-time ratios of a Lamb wave, where the solving the stress coefficients in S3 is specifically as follows:

in a case where $\theta = \omega = 0°$, $$R' = (2n_1 + n_2 + n_3)\sigma \quad (18)$$

in a case where $\theta = 0°$, $\omega = 45°$ $$R' = (n_1 + n_2)\sigma \quad (19)$$

in a case where $\theta = \omega = 45°$, $$R' = (n_2 + n_4)\sigma \quad (20)$$

in a case where $\theta = 45°$, $\omega = 90°$ $$R' = (n_2 - n_1)\sigma \quad (21)$$

where $$R' = \frac{V_{A0} - V_{S0}}{R - 1} - V_{S0} \quad (22)$$

the equations (18)-(22) are simultaneous to obtain $n_1$, $n_2$, $n_3$ and $n_4$.

An air-coupled ultrasonic plane stress detection method for a composite material based on dual-modal sound-time ratios of a Lamb wave, where the acquiring three sound-time ratios in S4 specifically includes: placing the exciting air-coupled transducer and the receiving air-coupled transducer at a dip angle $\alpha$ on one side of a composite material panel test sample, allowing the included angle between a connection direction of the exciting air-coupled transducer and the receiving air-coupled transducer and the principal direction of the fiber to be $\omega = 0°$, and setting a distance between the receiving air-coupled transducer and the exciting air-coupled transducer to be L; performing stretching by using unidirectional stress and superposing the stretching direction with the fiber direction of the composite material panel, i.e., the included angle $\theta = 0°$; determining an exciting signal cycle as N, determining a center frequency f of the exciting air-coupled transducer and the receiving air-coupled transducer, and extracting and receiving sounds and times of the asymmetric mode A0 and the symmetric mode S0 in an echo signal and substituting the sounds and times into the equation (17) to obtain the sound-time ratios;

applying stretching and compressing stress with a certain step length to a composite material panel standard component by means of stretching and compressing experiments to obtain the sound-time ratios R under different stress, respectively, in order to eliminate accidental errors, repeating the experiments for 10 times under the same stress to obtain 10 sound-time ratios, and averaging the sound-time ratios as the sound-time ratio under the stress, and substituting the sound-time ratio into the equation (22) to obtain $\overline{R}$; acquiring N groups of data $(\overline{R}_i, \sigma_i)$, i=1, 2, 3 ... N, and obtaining a relation expression between the stress and the sound-time ratio through least-squares algorithm linear fitting, $$\overline{R} = k\sigma \quad (23)$$

where k is a slope of a straight line obtained by least-squares algorithm linear fitting; and selecting $\theta = 0°$, $\omega = 45°$; $\theta = \omega = 45°$; $\theta = 45°$, $\omega = 90°$ respectively, and repeating the above process three times to obtain the equations (18)-(21) that are simultaneous to obtain n1, n2, n3 and n4.

An air-coupled ultrasonic plane stress detection method for a composite material based on dual-modal sound-time ratios of a Lamb wave, where based on the sound-time ratios in S4, the describing the stress state of the detection point in S5 specifically comprises: performing step-scanning on a to-be-measured region of the composite material panel test sample in x and y directions with $\Delta x$ and $\Delta y$ as step pitches, respectively, where for each stress detection point P, the included angle $\theta$ between the principal stress $\sigma_1$ and $\sigma_2$ and the fiber direction and the stress direction are unknown, selecting $\omega_1=-45°$, $\omega_2=0°$ and $\omega_3=45°$ by using the S4 for experiments three times, acquiring the stress state of the point P through the equations (12)-(16) in combination with the stress coefficients n1, n2, n3 and n4 acquired by calibration, repeating the process, and after completing the scanning, acquiring the stress state of the entire composite material test sample.

The present invention has the beneficial effects:

The present invention implements stress representation by replacing the current sound-time differences with the sound-time ratios of the symmetric mode ($S_0$) and the asymmetric mode ($S_0$) of the Lamb wave, eliminating the value L in the stress coefficient expression, thereby further eliminating the propagating distance L of the ultrasonic wave caused by processing, assembling and temperature range. Compared with the prior art, the link of introducing errors is omitted, so that the accuracy of stress coefficient calibration and air-coupled ultrasonic stress representation of the composite material panel can be greatly improved.

DETAILED DESCRIPTION OF THE EMBODIMENTS

Figure 1:
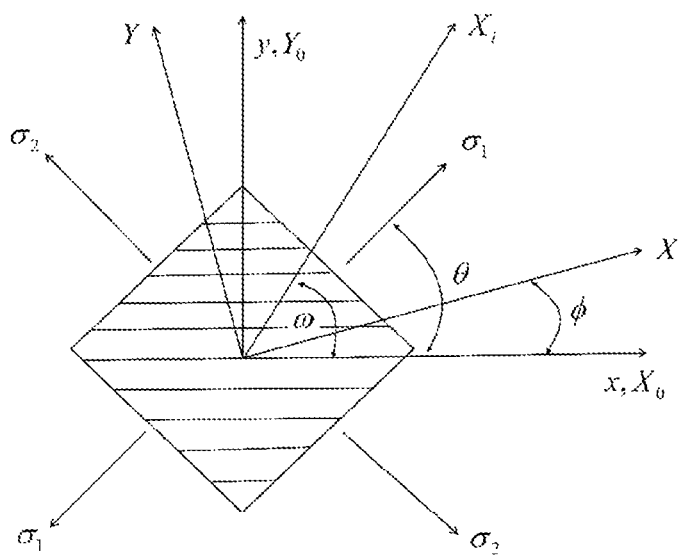
FIG. 1 is a schematic diagram of an analytical coordinate system of the present invention.
Figure 2:
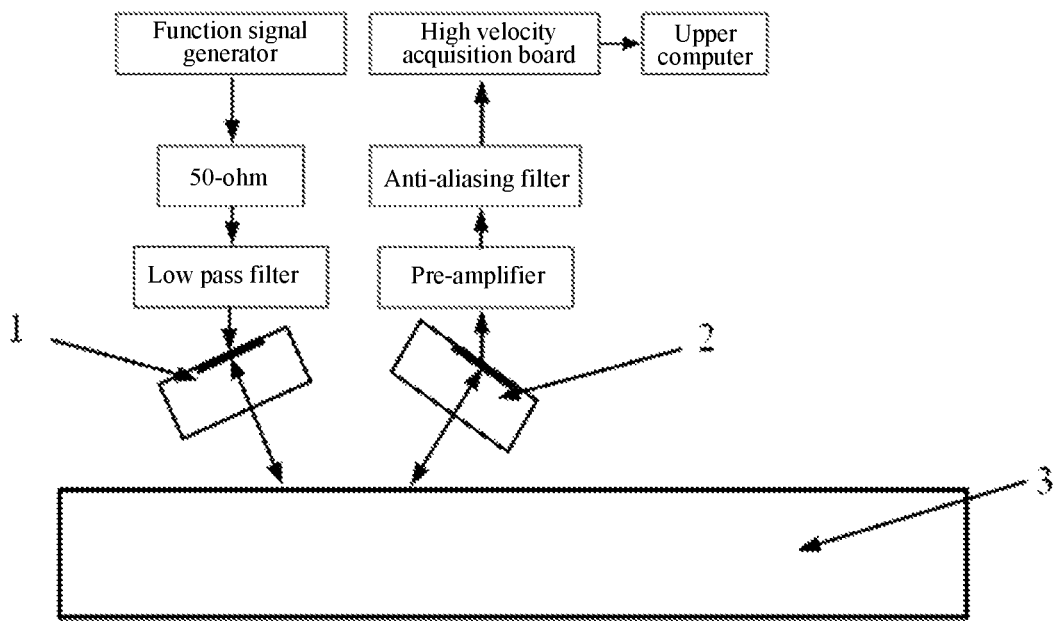
FIG. 2 is a schematic diagram of an experimental device of the present invention.
Figure 3:
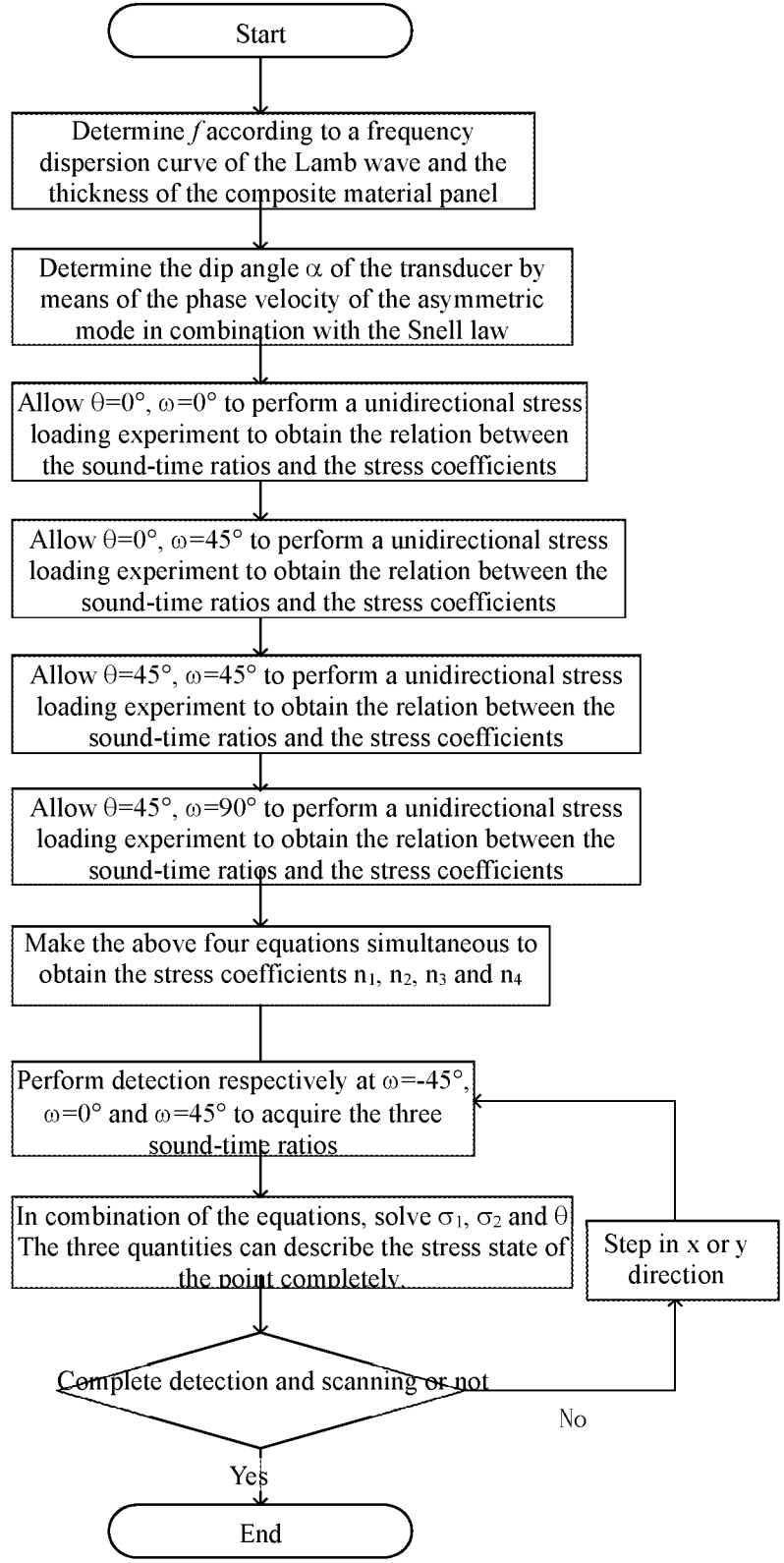
FIG. 3 is a flow diagram of a method of the present invention.

The technical solutions in the embodiments of the present invention will be clearly and completely described below in combination with the accompanying drawings in the embodiments of the present invention. Apparently the embodiments described are merely some rather than all of the embodiments of the present invention. Based on the embodiments in the present invention, all other embodiments obtained by those of ordinary skill in the art without making creative efforts fall within the protection scope of the present invention.

The center frequency of the air-coupled transducer is determined as f and the dip angle thereof is $\alpha$ according to a frequency dispersion curve and a Snell law of the Lamb wave. The included angle between a connection direction of the exciting air-coupled transducer and the receiving air-coupled transducer and the principal direction of the fiber is allowed to be $\omega$. The air-coupled transducer is placed as required on one side of the composite material panel, and the propagation distance of the acoustic wave between the exciting air-coupled transducer and the receiving air-coupled transducer is set to be an appropriate value. In order to guarantee an acoustic beam with enough energy, the exciting signal cycle is determined as N, a signal generator is connected to a power amplifier to generate an exciting signal, and subjected to impedance matching of the 50-ohm load and the low pass filter, the exciting signal is applied to the exciting air-coupled transducer. The echo is received by the receiving air-coupled transducer in a receiving position, is amplified and filtered by the pre-amplifier and the anti-aliasing filter, and is collected by the high speed acquisition board and uploaded to the upper computer. The sounds and times of the zero-order symmetrical mode (S0) and the zero-order asymmetric model (A0) are extracted to acquire the sound-time ratio $R_\omega$. The included angle $\omega$ between a connection direction of the exciting air-coupled transducer and the receiving air-coupled transducer and the principal direction of the fiber of the material is changed, the sound-time ratios $R_{\omega 1}$, $R_{\omega 2}$ and $R_{\omega 3}$ are measured and extracted three times, and the sound-time ratios are simultaneous to obtain the stress state in the corresponding position (x,y). Next, $\Delta x$ and $\Delta y$ steps can be performed along the scanning direction to continue the above process till scanning is completed, so as to obtain the stress state of the entire composite material panel.

An air-coupled ultrasonic plane stress detection method for a composite material based on dual-modal sound-time ratios of a Lamb wave specifically includes the following steps:

S1: a detection device is assembled;

S2: based on the detection device and the dual-modal sound-time ratios of the Lamb wave in S1, unidirectionally loaded stress is used to obtain different stress coefficient relations;

S3: based on the stress coefficient relations in S2, stress coefficients are solved;

S4: based on the stress coefficients in S3, three sound-time ratios are acquired;

S5: based on the sound-time ratios in S4, a stress state of a detection point is described; and S6: S4 and S5 are repeated till detection and scanning are completed.

An air-coupled ultrasonic plane stress detection method for a composite material based on dual-modal sound-time ratios of a Lamb wave, where S1 is specifically as follows: the detection device includes a function signal generator, a 50-ohm load, a low pass filter, a high speed acquisition board, an anti-aliasing filter, a pre-amplifier, an upper computer, an exciting air-coupled transducer 1, a receiving air-coupled transducer 2 and a composite material panel 3;

a signal emitted by the function signal generator is emitted to the composite material panel 3 through the 50-ohm load, the low pass filter and the exciting air-coupled transducer 1, the composite material panel 3 reflects the received signal back to the receiving air-coupled transducer 2, and the receiving air-coupled transducer 2 transmits the signal to the upper computer through the pre-amplifier, the anti-aliasing filter and the high speed acquisition board.

An air-coupled ultrasonic plane stress detection method for a composite material based on dual-modal sound-time ratios of a Lamb wave, where the dual-modal sound-time ratios of the Lamb wave in S2 are specifically as follows: the technical principle of the dual-modal sound-time ratios of the Lamb wave are specifically described with reference to FIG. 1. The analytical coordinate system shown in FIG. 1 is established to analyze the propagation law of the Lamb wave in the composite material panel. Three coordinate systems are used in FIG. 1, which are respectively (1) the coordinate system XOY (the fiber coordinate system, usually known) of the principal direction of the material; (2) the coordinate system $\sigma_1 O \sigma_2$ of the principal stress (known for detection); and (3) the measurement coordinate system XiOYi (actual detection direction, known). With respect to the composite material panel, the paving direction of the fiber is often easily accessible. Therefore, during ultrasonic stress measurement, the fiber direction is taken as angular reference all the time.

In an orthotropic medium, the ultrasonic wave has different propagation velocities in different directions. The ultrasonic wave propagated in the principal direction of the material has an extreme value of the propagation velocity, that is, the ultrasonic wave corresponds to the principal direction of the ultrasonic wave. In the unstress state, it is assumed that the ultrasonic wave in the XOY plane has two principal propagation directions $X_0$ and $Y_0$. At the time, it is in a natural state. When the material bears the principal stress of the plane forming an angle $\theta$ with the fiber direction, it corresponds to a deformation state. Relative to the unstress state, the propagation sound velocity and the principal propagation direction affected by the stress will change. It is assumed that the coordinate system of the principal propagation direction at the time is XOY, and the coordinate system forms an angle $\phi$ with the coordinate system of the material direction. It can be known from an elastic wave equation in the anisotropic medium that there is an approximately linear relation between the velocity change $\Delta V_{ij}$ (i,j=1,2,3) and the ultrasonic wave and the stress $\sigma$ $\sigma_{kl}$ (k,l=1,2,3). For the convenience of analysis, the sound velocity matrix $[V_{ij}]$ is defined:

$$V_{ij} = (V_{ij})_0 + \Delta V_{ij}, \Delta V_{ij} = \alpha_{ij}\sigma_{kl} \tag{1}$$

where $\alpha_{ij}$ is a matrix representing an orthotropic stress coefficient, and the form of the matrix is similar to that of a rigidity matrix:

$$[\alpha_{ij}] = \begin{bmatrix} \alpha_{11} & \alpha_{12} & \alpha_{13} & & & \\ \alpha_{12} & \alpha_{22} & \alpha_{23} & & 0 & \\ \alpha_{13} & \alpha_{23} & \alpha_{33} & & & \\ & & & \alpha_{44} & & \\ & 0 & & & \alpha_{55} & \\ & & & & & \alpha_{66} \end{bmatrix} \tag{2}$$

For the stress in an XOY plane, $\sigma_{zz} = \sigma_{xz} = \sigma_{yz} = 0$; Then:

$$[\Delta V_{ij}] = \begin{bmatrix} \Delta V_X & & \\ & \Delta V_Y & \\ & & \Delta V_Z \end{bmatrix} = \tag{3}$$

$$\begin{bmatrix} \alpha_{11}\sigma_{xx} + \alpha_{12}\sigma_{yy} & \alpha_{66}\sigma_{xy}/2 & \\ \alpha_{66}\sigma_{xy}/2 & \alpha_{12}\sigma_{xx} + \alpha_{22}\sigma_{yy} & \\ & & \alpha_{13}\sigma_{xx} + \alpha_{23}\sigma_{yy} \end{bmatrix}$$

A sound velocity change matrix $[\Delta V_{ij}]$ has a vector decomposition characteristic similar to that of the stress, a principle value of $[\Delta V_{ij}]$ is as follows:

$$\Delta V_{X,Y} = \frac{1}{2}\Big\{[(\alpha_{11}+\alpha_{12})\sigma_{xx} + (\alpha_{12}+\alpha_{22})\sigma_{yy}] \pm \sqrt{[(\alpha_{11}-\alpha_{12})\sigma_{xx} + (\alpha_{12}-\alpha_{22})\sigma_{yy}]^2 + (\alpha_{66}\sigma_{xy})^2}\Big\} \tag{4}$$

$$\tan 2\phi = \frac{\alpha_{66}\sigma_{xy}}{(\alpha_{11}-\alpha_{12})\sigma_{xx} + (\alpha_{12}-\alpha_{22})\sigma_{yy}} \tag{5}$$

there is the following relation between the stress in any direction and the principal stress $\sigma_1$ and $\sigma_2$:

$$\begin{cases} \sigma_{xx} = \frac{1}{2}[\sigma_1 + \sigma_2 + (\sigma_1 - \sigma_2)\cos 2\theta] \\ \sigma_{yy} = \frac{1}{2}[\sigma_1 + \sigma_2 - (\sigma_1 - \sigma_2)\cos 2\theta] \\ \sigma_{xy} = \frac{1}{2}(\sigma_1 - \sigma_2)\sin 2\theta \end{cases} \tag{6}$$

the equation (6) is substituted into the equation (4) to obtain sound velocity change $\Delta V_\omega$ in any direction in the state of plane stress as follows:

$$\Delta V_\omega = \frac{1}{2}\Big[\frac{\sigma_1+\sigma_2}{2}(\alpha_{11}+\alpha_{22}+2\alpha_{12}) + \frac{\sigma_1-\sigma_2}{2}(\alpha_{11}-\alpha_{22})\cos 2\theta\Big] + \frac{1}{2}\Bigg\{\Bigg[\frac{\frac{\sigma_1+\sigma_2}{2}(\alpha_{11}-\alpha_{22}) + }{\frac{\sigma_1-\sigma_2}{2}(\alpha_{11}+\alpha_{22}-2\alpha_{12})\cos 2\theta}\Bigg]^2 + \Big(\frac{\sigma_1-\sigma_2}{2}\alpha_{66}\sin 2\theta\Big)^2\Bigg\}^{\frac{1}{2}} \cos 2(\omega - \phi) \tag{7}$$

the equation (5) is substituted into the equation (7) to obtain a relation between the velocity change and the principle stress of the plane as follows:

$$\Delta V_\omega = \frac{\alpha_{11}+\alpha_{22}+2\alpha_{12}}{4}(\sigma_1+\sigma_2) + \frac{\alpha_{11}-\alpha_{22}}{4}(\sigma_1-\sigma_2)\cos 2\theta + \frac{\alpha_{11}-\alpha_{22}}{4}(\sigma_1+\sigma_2)\cos 2\omega + \frac{\alpha_{11}+\alpha_{22}-2\alpha_{12}}{4}(\sigma_1-\sigma_2)\cos 2\theta \cos 2\omega + \frac{\alpha_{66}}{4}(\sigma_1-\sigma_2)\sin 2\theta \sin 2\omega \tag{8}$$

the following constants are introduced:

$$\begin{cases} n_1 = (\alpha_{11} - \alpha_{22})/4 \\ n_2 = (\alpha_{11} + \alpha_{22} + 2\alpha_{12})/4 \\ n_3 = (\alpha_{11} + \alpha_{22} - 2\alpha_{12})/4 \\ n_4 = \alpha_{66}/4 \end{cases} \tag{9}$$

the equation (8) can be transformed into:

$$\Delta V_\omega = K_1\sigma_1 + K_2\sigma_2$$

$K_1 = n_1(\cos 2\theta + \cos 2\omega) + n_2 + n_3 \cos 2\theta \cos 2\omega + n_4 \sin 2\theta \sin 2\omega$ $$K_2 = -n_1(\cos 2\theta - \cos 2\omega) + n_2 - n_3 \cos 2\theta \cos 2\omega - n_4 \sin 2\theta \sin 2\omega \tag{10}$$

where $K_1$ and $K_2$ are proportionality coefficients between velocity change and the principal stress $\sigma_1$ and $\sigma_2$ of the plane, respectively.

An air-coupled ultrasonic plane stress detection method for a composite material based on dual-modal sound-time ratios of a Lamb wave, where the Lamb wave is propagated in the composite material panel the phase velocities of a symmetric mode and an asymmetric mode of the Lamb wave can be represented as:

$V_{S0\sigma} = K_1\sigma_1 + K_2\sigma_2 + V_{S0}$ $$V_{A0\sigma} = K_1\sigma_1 + K_2\sigma_2 + V_{A0} \tag{11}$$

where $V_{S0\sigma}$ and $V_{A0\sigma}$ are phase velocities of the symmetric mode and the asymmetric mode in the stress state, and $V_{S0}$ and $V_{A0}$ are initial phase velocities of the symmetric mode and the asymmetric mode in the unstress state.

An air-coupled ultrasonic plane stress detection method for a composite material based on dual-modal sound-time ratios of a Lamb wave, where a ratio of propagation time of the asymmetric mode to propagation time of the symmetric mode is taken as follows:

$$R = \frac{T_{A0\sigma}}{T_{S0\sigma}} = \frac{V_{S0\sigma}}{V_{A0\sigma}} = \frac{K_1\sigma_1 + K_2\sigma_2 + V_{A0}}{K_1\sigma_1 + K_2\sigma_2 + V_{S0}} = 1 + \frac{V_{A0} - V_{S0}}{K_1\sigma_1 + K_2\sigma_2 + V_{S0}} \quad (12)$$

the equation (12) is the relation between the ratio of the propagation time of the symmetric mode to the propagation time of the asymmetric mode of the Lamb wave and the principal stress in the plane problem of the composite material. There are three unknown quantities $\sigma_1$, $\sigma_2$ and $\theta$ for the orthotropic panel in the stress state of the plane. Therefore, it needs to measure the ratios $R_{\omega 1}$, $R_{\omega 2}$ and $R_{\omega 3}$ of the propagation time of the symmetric mode to the propagation time of the asymmetric mode of the Lamb wave in three different directions $\omega_1$, $\omega_2$ and $\omega_3$, and the ratios are solved through simultaneous equations.

To simplify calculation, measurement angles $\omega_1 = -45°$, $\omega_2 = 0°$ and $\omega_3 = 45°$ are taken to acquire the ratios of the propagation times of the symmetric mode and the asymmetric mode of the corresponding Lamb wave, $R_1$, $R_2$ and $R_3$:

$$\begin{cases} R_1 = \dfrac{V_{A0} - V_{S0}}{R_{\omega 1} - 1} - V_{s0} \\ R_2 = \dfrac{V_{A0} - V_{S0}}{R_{\omega 2} - 1} - V_{s0} \\ R_3 = \dfrac{V_{A0} - V_{S0}}{R_{\omega 3} - 1} - V_{s0} \end{cases} \quad (13)$$

for the convenience of calculation and expression, the following variable parameters are introduced:

$$\begin{cases} L = \sigma_1 + \sigma_2 \\ M = \sin 2\theta(\sigma_1 - \sigma_2) \\ N = \cos 2\theta(\sigma_1 - \sigma_2) \end{cases} \quad (14)$$

a calculation expression of the amplitude and direction of the principal stress can be obtained by solving the equation (14):

$$\begin{cases} \sigma_1 = \dfrac{1}{2}\left(\sqrt{M^2 + N^2} + L\right) \\ \sigma_2 = \dfrac{1}{2}\left(L - \sqrt{M^2 + N^2}\right) \\ \theta = \dfrac{1}{2}\arctan\left(\dfrac{M}{N}\right) \end{cases} \quad (15)$$

the three equations in the three directions are simultaneous to obtain:

$$\begin{cases} L = \dfrac{(n_1 + n_3)(R_1 + R_3) - 2n_1 R_2}{2(n_2 n_3 - n_1^2)} \\ N = \dfrac{(n_1 + n_2(R_1 + R_3) - 2n_2 R_2}{2(n_1^2 - n_2 n_3)} \\ M = \dfrac{R_3 - R_1}{2n_4} \end{cases} \quad (16)$$

the equation (16) is substituted into the equation (15) to obtain the amplitude and direction of the principal stress in the plane of the measured composite material, so as to acquire the stress state in the plane in any direction.

An air-coupled ultrasonic plane stress detection method for a composite material based on dual-modal sound-time ratios of a Lamb wave, where the unidirectionally loaded stress is $\sigma_1 = \sigma$ and $\sigma_2 = 0$, and the equation (12) can be transformed into:

$$R = \frac{T_{A0\sigma}}{T_{S0\sigma}} = \frac{V_{S0\sigma}}{V_{A0\sigma}} = \frac{K_1\sigma + V_{A0}}{K_1\sigma + V_{S0}} = 1 + \frac{V_{A0} - V_{S0}}{K_1\sigma + V_{S0}} \quad (17)$$

$$K_1 = n_1(\cos 2\theta + \cos 2\omega) + n_2 + n_3 \cos 2\theta \cos 2\omega + n_4 \sin 2\theta \sin 2\omega$$

$\theta$ in the equation (17) is an included angle between a fiber direction and the stress, $\omega$ is an included angle between a detection direction and the fiber direction, and the two angles are combined differently to obtain different stress coefficient relations.

An air-coupled ultrasonic plane stress detection method for a composite material based on dual-modal sound-time ratios of a Lamb wave, where the solving the stress coefficients in S3 is specifically as follows: the following angle combination calibration experiment is designed in the present invention to determine the ultrasonic stress coefficients:

in a case where $\theta = \omega = 0°$, $$R' = (2n_1 + n_2 + n_3)\sigma \quad (18)$$

in a case where $\theta = 0°$, $\omega = 45°$ $$R' = (n_1 + n_2)\sigma \quad (19)$$

in a case where $\theta = \omega = 45°$, $$R' = (n_2 + n_4)\sigma \quad (20)$$

in a case where $\theta = 45°$, $\omega = 90°$ $$R' = (n_2 - n_1)\sigma \quad (21)$$

where $$R' = \frac{V_{A0} - V_{S0}}{R - 1} - V_{S0} \quad (22)$$

With respect to the composite material panel, $V_{S0}$ and $V_{A0}$ are easily accessible, so that the equations (18)-(22) are simultaneous to obtain $n_1$, $n_2$, $n_3$ and $n_4$.

An air-coupled ultrasonic plane stress detection method for a composite material based on dual-modal sound-time ratios of a Lamb wave, where the acquiring the three sound-time ratios in S4 is specifically as follows: the specific calibration process is described below by taking $\theta = \omega = 0°$ as an example:

The Lamb wave has the symmetric mode and the asymmetric mode and dispersion characteristics. Multi-order symmetric modes ($S_0$, $S_1$ ... $S_i$) and asymmetric modes ($A_0$, $A_1 \ldots A_i$) can be excited at the same exciting frequency. In order to allow the air-coupled transducer to excite relatively pure modes in the composite material panel, the exciting frequency f is determined according to the frequency dispersion curve of the Lamb wave in combination with the thickness of the to-be-detected component. After the product of frequency and thickness (frequency×thickness of the composite material panel) is determined, the phase velocity of the asymmetric mode $A_0$ can be known, so that the dip angle $\alpha$ of the exciting and receiving air-coupled transducers are determined according to the first critical angle of refraction of the Snell law in combination with the propagation velocity in air. The exciting air-coupled transducer is placed at a dip angle $\alpha$ on one side of a composite material panel test sample, the included angle between the connection direction of the exciting air-coupled transducer and the receiving air-coupled transducer and the principal direction of the fiber is allowed to be $\omega=0°$, and the distance between the receiving air-coupled transducer and the exciting air-coupled transducer is set to be L. Stretching is performed by using unidirectional stress and the stretching direction is superposed with the fiber direction of the composite material panel, i.e., the included angle $\theta=0°$; in order to guarantee the acoustic beam with enough energy, the exciting signal cycle is determined as N, the signal generator is connected to the power amplifier to generate an exciting signal according to the above determined center frequency f of the air-coupled transducer, and subjected to impedance matching of the 50-ohm load and the low pass filter, the exciting signal is applied to the exciting air-coupled transducer. The echo is received by the receiving air-coupled transducer in the receiving position, is amplified and filtered by the pre-amplifier and the anti-aliasing filter, and is collected by the high speed acquisition board and uploaded to the upper computer. Sounds and times of the asymmetric mode $A_0$ and the symmetric mode $S_0$ in an echo signal are extracted and received and the sounds and times are substituted into the equation (17) to obtain the sound-time ratios.

Stretching and compressing stress (it is stipulated that the tensile stress is negative and the compressive stress is positive) is applied with a certain step length to a composite material panel standard component by means of stretching and compressing experiments to obtain the sound-time ratios R under different stress, respectively, in order to eliminate accidental errors, the experiments are repeated for 10 times under the same stress to obtain 10 sound-time ratios, and the sound-time ratios averaged as the sound-time ratio under the stress, and the sound-time ratio is substituted into the equation (22) to obtain $\overline{R}$; N groups of data $(\overline{R}_i, \sigma_i)$ are acquired, i=1, 2, 3 ... N, and a relation expression between the stress and the sound-time ratio is obtained through least-squares algorithm linear fitting, $$\overline{R} = k\sigma \quad (23)$$

where k is a slope of a straight line obtained by least-squares algorithm linear fitting; and $\theta=0°$, $\omega=45°$; $\theta=\omega=45°$; $\theta=45°$, $\omega=90°$ are selected respectively, and the above process is repeated three times to obtain the equations (18)-(21) that are simultaneous to obtain $n_1$, $n_2$, $n_3$ and $n_4$.

An air-coupled ultrasonic plane stress detection method for a composite material based on dual-modal sound-time ratios of a Lamb wave, where based on the sound-time ratios in S4, the describing the stress state of the detection point in S5 specifically includes: step-scanning is performed on a to-be-measured region of the composite material panel test sample in x and y directions with $\Delta x$ and $\Delta y$ as step pitches, respectively, where for each stress detection point P, the included angle $\theta$ between the principal stress $\sigma_1$ and $\sigma_2$ and the fiber direction and the stress direction are unknown, selecting $\omega_1=-45°$, $\omega_2=0°$ and $\omega_3=45°$ by using the S4 for experiments three times, acquiring the stress state of the point P through the equations (12)-(16) in combination with the stress coefficients $n_1$, $n_2$, $n_3$ and $n_4$ acquired by calibration, repeating the process, and after completing the scanning, acquiring the stress state of the entire composite material test sample.

What is claimed is:

1. An air-coupled ultrasonic plane stress detection method for a composite material based on dual-modal sound-time ratios of a Lamb wave, comprising the following steps:

S1: configuring a detection device to emit a signal to a detection point of the composite material in the form of the Lamb wave;

S2: receiving a reflected signal by the detection device; measuring unidirectionally loaded stress; based on the reflected signal and the dual-modal sound-time ratios of the Lamb wave in S1, and using unidirectionally loaded stress to obtain different stress coefficient relations;

S3: based on the stress coefficient relations in S2, solving stress coefficients;

S4: based on the stress coefficients in S3, acquiring three sound-time ratios;

S5: based on the three sound-time ratios in S4, describing a stress state of the detection point; and S6: repeating S4 and S5 till completing detection and scanning of all points.

2. The air-coupled ultrasonic plane stress detection method according to claim 1, wherein S1 is implemented as follows: the detection device comprises a function signal generator, a 50-ohm load, a low pass filter, a high speed acquisition board, an anti-aliasing filter, a pre-amplifier, an upper computer, an exciting air-coupled transducer, a receiving air-coupled transducer and a composite material panel; wherein the signal emitted by the function signal generator is emitted to the composite material panel through the 50-ohm load, the low pass filter and the exciting air-coupled transducer, the composite material panel reflects the received signal back to the receiving air-coupled transducer, and the receiving air-coupled transducer transmits the signal to the upper computer through the pre-amplifier, the anti-aliasing filter and the high speed acquisition board.

3. The air-coupled ultrasonic plane stress detection method according to claim 1, wherein the dual-modal sound-time ratios of the Lamb wave in S2 comprise: defining a sound velocity matrix $[V_{ij}]$:

$$V_{ij}=(V_{ij})_0+\Delta V_{ij}, \Delta V_{ij}=\alpha_{ij}\sigma_{kl} \quad (1)$$

wherein $\alpha_{ij}$ is a matrix representing an orthotropic stress coefficient, and a form of the matrix is similar to a form of a rigidity matrix:

$$[\alpha_{ij}] = \begin{bmatrix} \alpha_{11} & \alpha_{12} & \alpha_{13} & & & \\ \alpha_{12} & \alpha_{22} & \alpha_{23} & & 0 & \\ \alpha_{13} & \alpha_{23} & \alpha_{33} & & & \\ & & & \alpha_{44} & & \\ & 0 & & & \alpha_{55} & \\ & & & & & \alpha_{66} \end{bmatrix} \quad (2)$$

for a stress in an XOY plane, $\sigma_{zz}=\sigma_{xz}=\sigma_{yz}=0$;

then:

$$[\Delta V_{ij}] = \begin{bmatrix} \Delta V_X & & \\ & \Delta V_Y & \\ & & \Delta V_Z \end{bmatrix} = \quad (3)$$

$$\begin{bmatrix} \alpha_{11}\sigma_{xx} + \alpha_{12}\sigma_{yy} & \alpha_{66}\sigma_{xy}/2 & \\ \alpha_{66}\sigma_{xy}/2 & \alpha_{12}\sigma_{xx} + \alpha_{22}\sigma_{yy} & \\ & & \alpha_{13}\sigma_{xx} + \alpha_{23}\sigma_{yy} \end{bmatrix}$$

a sound velocity change matrix $[\Delta V_{ij}]$ has a vector decomposition characteristic similar to a vector decomposition characteristic of the stress, a principle value of $[\Delta V_{ij}]$ is as follows:

$$\Delta V_{X,Y} = \frac{1}{2}\Big\{[(\alpha_{11}+\alpha_{12})\sigma_{xx} + (\alpha_{12}+\alpha_{22})\sigma_{yy}] \pm \quad (4)$$
$$\sqrt{[(\alpha_{11}-\alpha_{12})\sigma_{xx} + (\alpha_{12}-\alpha_{22})\sigma_{yy}]^2 + (\alpha_{66}\sigma_{xy})^2}\Big\}$$

$$\tan 2\phi = \frac{\alpha_{66}\sigma_{xy}}{(\alpha_{11}-\alpha_{12})\sigma_{xx} + (\alpha_{12}-\alpha_{22})\sigma_{yy}} \quad (5)$$

there is the following relation between a stress in any direction and a principal stress $\sigma_1$ and $\sigma_2$:

$$\begin{cases} \sigma_{xx} = \frac{1}{2}[\sigma_1 + \sigma_2 + (\sigma_1 - \sigma_2)\cos 2\theta] \\ \sigma_{yy} = \frac{1}{2}[\sigma_1 + \sigma_2 - (\sigma_1 - \sigma_2)\cos 2\theta] \\ \sigma_{xy} = \frac{1}{2}(\sigma_1 - \sigma_2)\sin 2\theta \end{cases} \quad (6)$$

the equation (6) is substituted into the equation (4) to obtain sound velocity change $\Delta V_\omega$ in any direction in a state of plane stress as follows:

$$\Delta V_\omega = \frac{1}{2}\Big[\frac{\sigma_1+\sigma_2}{2}(\alpha_{11}+\alpha_{22}+2\alpha_{12}) + \frac{\sigma_1-\sigma_2}{2}(\alpha_{11}-\alpha_{22})\cos 2\theta\Big] + \quad (7)$$

$$\frac{1}{2}\Big\{\Big[\frac{\sigma_1+\sigma_2}{2}(\alpha_{11}-\alpha_{22}) + \frac{\sigma_1-\sigma_2}{2}(\alpha_{11}+\alpha_{22}-2\alpha_{12})\cos 2\theta\Big]^2 + \Big(\frac{\sigma_1-\sigma_2}{2}\alpha_{66}\sin 2\theta\Big)^2\Big\}^{\frac{1}{2}}$$

$$\cos 2(\omega - \phi)$$

the equation (5) is substituted into the equation (7) to obtain a relation between a velocity change and the principal stress of the plane as follows:

$$\Delta V_\omega = \frac{\alpha_{11} + \alpha_{22} + 2\alpha_{12}}{4}(\sigma_1 + \sigma_2) + \quad (8)$$
$$\frac{\alpha_{11} - \alpha_{22}}{4}(\sigma_1 - \sigma_2)\cos 2\theta + \frac{\alpha_{11} - \alpha_{22}}{4}(\sigma_1 + \sigma_2)\cos 2\omega +$$
$$\frac{\alpha_{11} + \alpha_{22} - 2\alpha_{12}}{4}(\sigma_1 - \sigma_2)\cos 2\theta\cos 2\omega + \frac{\alpha_{66}}{4}(\sigma_1 - \sigma_2)\sin 2\theta\sin 2\omega$$

the following constants are introduced:

$$\begin{cases} n_1 = (\alpha_{11} - \alpha_{22})/4 \\ n_2 = (\alpha_{11} + \alpha_{22} + 2\alpha_{12})/4 \\ n_3 = (\alpha_{11} + \alpha_{22} - 2\alpha_{12})/4 \\ n_4 = \alpha_{66}/4 \end{cases} \quad (9)$$

the equation (8) is transformed into:

$$\Delta V_\omega = K_1 \sigma_1 + K_2 \sigma_2$$

$K_1 = n_1(\cos 2\theta + \cos 2\omega) + n_2 + n_3 \cos 2\theta \cos 2\omega + n_4 \sin 2\theta \sin 2\omega$ $K_2 = -n_1(\cos 2\theta - \cos 2\omega) + n_2 - n_3 \cos 2\theta \cos 2\omega - n_4 \sin 2\theta \sin 2\omega \quad (10)$ wherein $K_1$ and $K_2$ are proportionality coefficients between the velocity change and the principal stress $\sigma_1$ and $\sigma_2$ of the plane, respectively.

4. The air-coupled ultrasonic plane stress detection method according to claim 3, wherein the Lamb wave is propagated in the composite material panel, and phase velocities of a symmetric mode and an asymmetric mode of the Lamb wave are represented as:

$$V_{S0\sigma} = K_1 \sigma_1 + K_2 \sigma_2 + V_{S0}$$

$$V_{A0\sigma} = K_1 \sigma_1 + K_2 \sigma_2 + V_{A0} \quad (11)$$

wherein $V_{S0\sigma}$ and $V_{A0\sigma}$ are the phase velocities of the symmetric mode and the asymmetric mode in the stress state, and $V_{S0}$ and $V_{A0}$ are initial phase velocities of the symmetric mode and the asymmetric mode in an unstress state.

5. The air-coupled ultrasonic plane stress detection method according to claim 4, wherein a ratio of a propagation time of the asymmetric mode to a propagation time of the symmetric mode is taken as follows:

$$R = \frac{T_{A0\sigma}}{T_{S0\sigma}} = \frac{V_{S0\sigma}}{V_{A0\sigma}} = \frac{K_1\sigma_1 + K_2\sigma_2 + V_{A0}}{K_1\sigma_1 + K_2\sigma_2 + V_{S0}} = 1 + \frac{V_{A0} - V_{S0}}{K_1\sigma_1 + K_2\sigma_2 + V_{S0}} \quad (12)$$

the equation (12) is a relation between the ratio of the propagation time of the symmetric mode to the propagation time of the asymmetric mode of the Lamb wave and the principal stress in a plane problem of the composite material; there are three unknown quantities $\sigma_1$, $\sigma_2$ and $\theta$ for an orthotropic panel in the stress state of the plane; wherein the ratios $R_{\omega 1}$, $R_{\omega 2}$ and $R_{\omega 3}$ of the propagation time of the symmetric mode to the propagation time of the asymmetric mode of the Lamb wave in three different directions $\omega_1$, $\omega_2$ and $\omega_3$ are measured, and the ratios are solved through simultaneous equations.

6. The air-coupled ultrasonic plane stress detection method according to claim 5, wherein the unidirectionally loaded stress is $\sigma_1 = \sigma$ and $\sigma_2 = 0$, and the equation (12) is transformed into:

$$R = \frac{T_{A0\sigma}}{T_{S0\sigma}} = \frac{V_{S0\sigma}}{V_{A0\sigma}} = \frac{K_1\sigma + V_{A0}}{K_1\sigma + V_{S0}} = 1 + \frac{V_{A0} - V_{S0}}{K_1\sigma + V_{S0}} \quad (17)$$

$K_1 = n_1(\cos 2\theta + \cos 2\omega) + n_2 + n_3 \cos 2\theta \cos 2\omega + n_4 \sin 2\theta \sin 2\omega$ $\theta$ in the equation (17) is a first included angle between a fiber direction and the stress, $\omega$ is a second included angle between a detection direction and the fiber direction, and the first included angle and the second included angle are combined differently to obtain different stress coefficient relations.

7. The air-coupled ultrasonic plane stress detection method according to claim 6, wherein the step of solving the stress coefficients in S3 is implemented as follows:

in a case where $\theta=\omega=0°$, $$R'=(2n_1+n_2+n_3)\sigma \tag{18}$$

in a case where $\theta=0°$, $\omega=45°$ $$R'=(n_1+n_2)\sigma \tag{19}$$

in a case where $\theta=\omega=45°$, $$R'=(n_2+n_4)\sigma \tag{20}$$

in a case where $\theta=45°$, $\omega=90°$ $$R' = (n_2 - n_1)\sigma \tag{21}$$

wherein $$R' = \frac{V_{A0} - V_{S0}}{R-1} - V_{S0} \tag{22}$$

the equations (18)-(22) are simultaneous to obtain $n_1$, $n_2$, $n_3$ and $n_4$.

8. The air-coupled ultrasonic plane stress detection method according to claim 7, wherein the step of acquiring the three sound-time ratios in S4 comprises:

placing an exciting air-coupled transducer and a receiving air-coupled transducer at a dip angle $\alpha$ on one side of a composite material panel test sample, allowing an included angle between a connection direction of the exciting air-coupled transducer and the receiving air-coupled transducer and a principal direction of a fiber to be $\omega=0°$, and setting a distance between the exciting air-coupled transducer and the receiving air-coupled transducer to be L; performing stretching by using unidirectional stress and superposing the stretching direction with the fiber direction of the composite material panel, wherein the included angle $\theta=0°$; determining an exciting signal cycle as N, determining a center frequency f of the exciting air-coupled transducer and the receiving air-coupled transducer, and extracting and receiving sounds and times of the asymmetric mode A0 and the symmetric mode S0 in an echo signal and substituting the sounds and times into the equation (17) to obtain the sound-time ratios;

applying stretching and compressing stress with a certain step length to a composite material panel standard component by stretching and compressing experiments to obtain the sound-time ratios R under different stresses, respectively; in order to eliminate accidental errors, repeating the stretching and compressing experiments for 10 times under a same stress to obtain 10 sound-time ratios, and averaging the 10 sound-time ratios as the sound-time ratio under the stress, and substituting the sound-time ratio into the equation (22) to obtain $\overline{R}$; acquiring N groups of data ($\overline{R}_i,\sigma_i$), i=1, 2, 3 ... N, and obtaining a relation expression between the stress and the sound-time ratio through least-squares algorithm linear fitting, $$\overline{R}=k\sigma \tag{23}$$

wherein k is a slope of a straight line obtained by least-squares algorithm linear fitting; and selecting $\theta=0°$, $\omega=45°$; $\theta=\omega=45°$; $\theta=45°$, $\omega=90°$ respectively and repeating the above process for three times to obtain the equations (18)-(21) that are simultaneous to obtain $n_1$, $n_2$, $n_3$ and $n_4$.

9. The air-coupled ultrasonic plane stress detection method according to claim 8, wherein based on the three sound-time ratios in S4, the step of describing the stress state of the detection point in S5 comprises:

performing step-scanning on a to-be-measured region of the composite material panel test sample in x and y directions with $\Delta x$ and $\Delta y$ as step pitches, respectively, wherein for each stress detection point P, the included angle $\theta$ between the principal stress $\sigma_1$ and $\sigma_2$ and the fiber direction and the stress direction are unknown, selecting $\omega_1=-45°$, $\omega_2=0°$ and $\omega_3=45°$ by using the S4 to perform experiments for three times, acquiring the stress state of the point P through the equations (12)-(16) in combination with the stress coefficients $n_1$, $n_2$, $n_3$ and $n_4$ acquired by calibration, repeating the process, and after completing the scanning, acquiring the stress state of the entire composite material test sample.

* * * * *